(No Model.) 2 Sheets—Sheet 1.
F. F. JONES.
LEAK STOPPER OR BREACH PLATE.
No. 472,888. Patented Apr. 12, 1892.
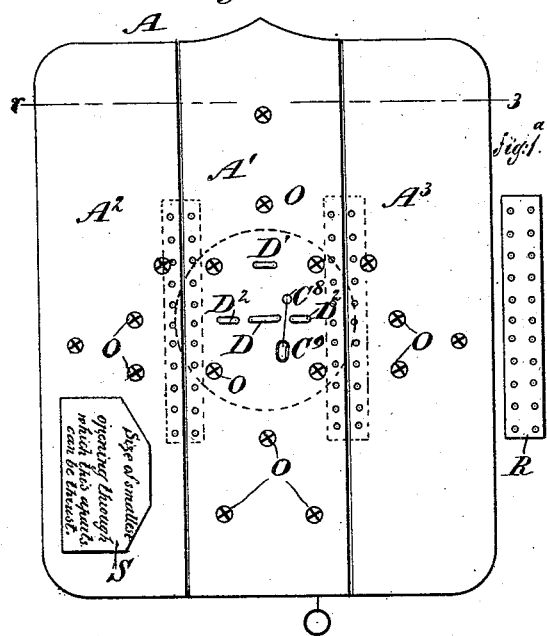
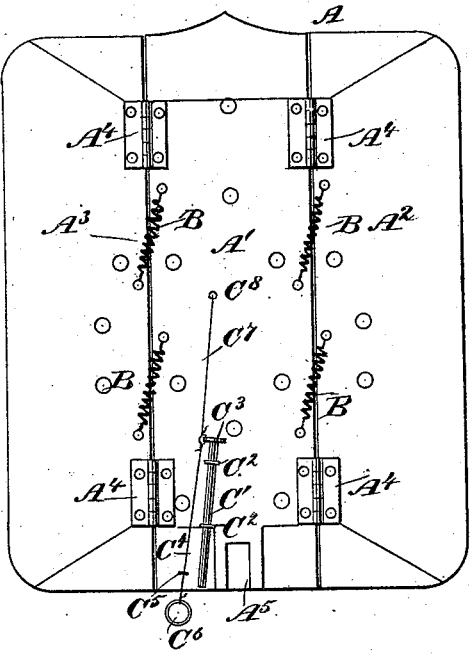
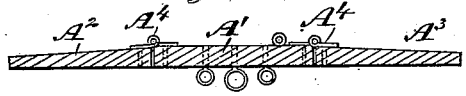
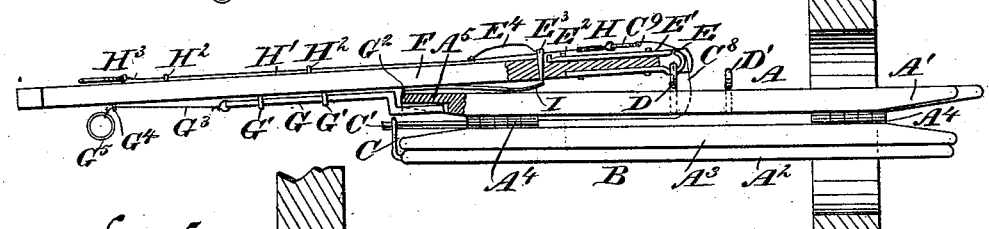
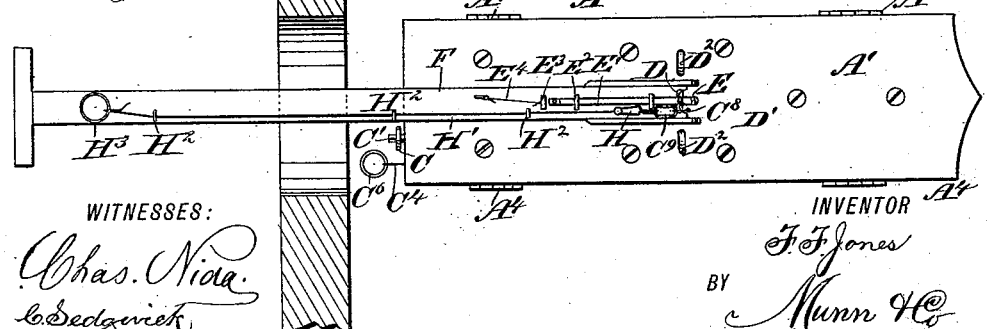
WITNESSES:
Chas. Nida.
C. Sedgwick.
INVENTOR
F. F. Jones
BY
Munn & Co.
ATTORNEYS.

(No Model.) 2 Sheets—Sheet 2.
F. F. JONES.
LEAK STOPPER OR BREACH PLATE.
No. 472,888. Patented Apr. 12, 1892.
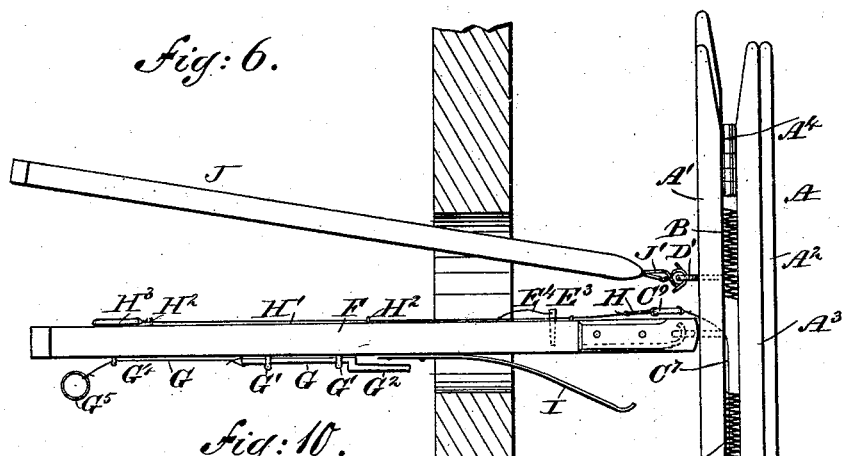
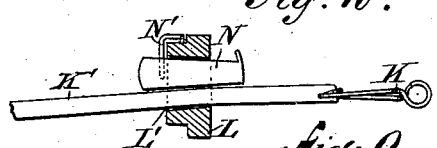
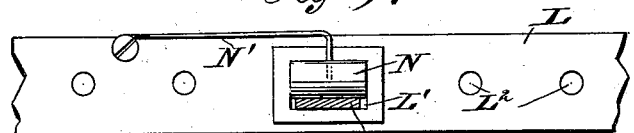
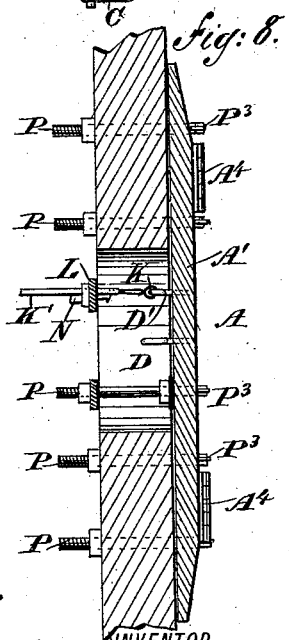
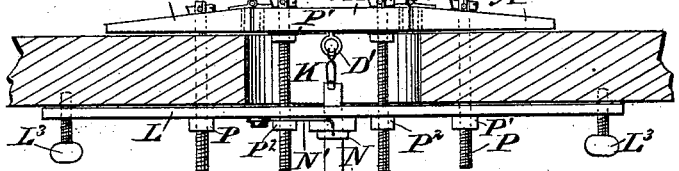
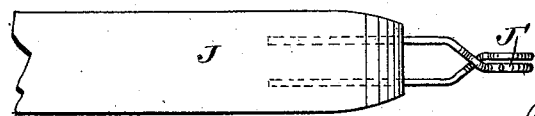
WITNESSES: INVENTOR
Chas. Nida F. F. Jones
C. Sedgwick BY Munn & Co.
ATTORNEYS

UNITED STATES PATENT OFFICE.

FRANCIS F. JONES, OF COMBER, CANADA.

LEAK-STOPPER OR BREACH-PLATE.

SPECIFICATION forming part of Letters Patent No. 472,888, dated April 12, 1892.

Application filed June 13, 1891. Serial No. 396,164. (No model.)

*To all whom it may concern:*

Be it known that I, FRANCIS F. JONES, a subject of the Queen of Great Britain, at present residing at Comber, in the Province of Ontario and Dominion of Canada, have invented a new and Improved Leak-Stopper or Breach-Plate, of which the following is a full, clear, and exact description.

The object of the invention is to provide a new and improved leak-stopper or breach-plate which is simple and durable in construction, very effective in operation, and more especially designed for rapidly and conveniently closing shot-holes or breaches in the bottom or side of a war-ship or other vessel.

The invention consists of a plate made in sections, hinged together and adapted to pass in a folded position through the opening in the vessel.

The invention further consists of special devices for releasing the folded sections to permit the same to swing into position against the outside of the vessel to close the leak.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the views.

Figure 1 is a face view of the plate as extended. Fig. 1ª is a face view of a joint-strip for the plate. Fig. 2 is a rear view of the same. Fig. 3 is a sectional plan view of the same on the line $x$ $x$ of Fig. 1. Fig. 4 is a side elevation of the plate folded up and supported in a horizontal position on the handle for thrusting the device through the opening in the vessel. Fig. 5 is a plan view of the same with the folded plate passed to the outside of the vessel. Fig. 6 is a side elevation of the same with the plate in a vertical position on the outside of the vessel. Fig. 7 is a plan view of the improvement as applied. Fig. 8 is a sectional side elevation of the same. Fig. 9 is an enlarged face view of the middle portion of the fastening-bar. Fig. 10 is a transverse section of the same. Fig. 11 is an enlarged plan view of the front end of the auxiliary handle. Fig. 12 is an enlarged side elevation of one of the fastening-bolts, and Fig. 13 is a like view of a modified form of fastening-bolt.

The improved leak-stopper is provided with a plate A, made of suitable material and in several sections A', $A^2$, and $A^3$, of which the outermost sections $A^2$ and $A^3$ are connected by hinges $A^4$ to opposite sides of the middle section A'.

On the rear of the plate A, as illustrated in Fig. 2, are arranged springs B, connecting the outer sections $A^2$ and $A^3$ with the middle section A' in such a manner that the said outermost sections are extended when released, as shown in Figs. 1 and 2, and as hereinafter more fully described.

On the outer section $A^2$, at the rear end of the same, is secured an eye C, adapted to be engaged by a bolt C', fitted to slide in bearings $C^2$, arranged on the rear of the middle section A'. The bolt C' is formed with a head $C^3$, connected with a wire $C^4$, passing through an eye $C^5$, arranged on the middle section A', the lower end of the said wire being provided with a ring $C^6$, serving as a handle. The head $C^3$ is also connected with a wire $C^7$, extending in an opposite direction to the wire $C^4$ and passing through an opening $C^8$ in the middle section A' from the rear of the latter to the front, the front end of the said wire $C^7$ carrying a ring $C^9$, serving as a handle, as plainly illustrated in Fig. 1. By pulling the ring $C^6$ the bolt C' is drawn outward to engage the eye C, and when the ring $C^9$ is pulled the said bolt C' is withdrawn from the eye.

In order to fold the plate A, the section $A^3$ is first swung onto the rear of this middle section A', and then the section $A^2$ is swung onto the section $A^3$, after which the operator pulls on the ring $C^6$, so that the bolt C' engages the eye C, and thereby locks the several sections in a folded position. When the ring $C^9$ is pulled, the bolt C' is withdrawn from the eye C, and the springs then force the several sections back into their normal position, so that the plate is extended, as shown in Figs. 1 and 2.

On the front of the middle section A' and near the middle of the same is secured an eye D, adapted to be engaged by a hook E, secured on a handle F, adapted to support the plate A when in a folded position, so as to thrust the said plate through the opening in the side or bottom of the vessel, as hereinafter more fully described.

In order to prevent the hook E from accidentally unhooking from the eye D, a locking-bolt E' is provided, mounted to slide in suitable bearings $E^2$ on top of the handle F. The outer end of the locking-bolt E' is adapted to engage the end of the hook E, as plainly shown in Fig. 4, so that the eye D is located in place in the said hook. In order to prevent the bolt E' from accidentally opening the hook E by sliding rearward, a wedge $E^3$ is provided, adapted to be inserted in the handle F at the rear of the bolt E' when the latter is in its outermost position, as shown in Fig. 4. The wedge $E^3$ is held on the end of a wire or chain $E^4$, secured to the handle F. The wedge $E^3$ and the wire $E^4$ may be omitted.

When the handle F supports the folded-up plate, as previously described, the ring $C^9$, before mentioned, is engaged by a clasp or spring-hook H, held on one end of a wire or rope H', passing through eyes $H^2$, secured on the top of the handle F, as plainly illustrated in Figs. 4, 5, and 6. The outer end of the wire or chain H' carries a ring $H^3$, serving as a handle, so as to manipulate the bolt C' in the manner hereinafter more fully described.

On the under side of the handle F and near its front end is secured a flat spring I, adapted to engage with its free end the inner surface of the middle section A' of the plate A, as plainly illustrated in Fig. 4, and for the purpose hereinafter more fully described.

On the under side of the handle F, in the rear of the spring I, is mounted to slide in eyes G' a bolt G, formed at its front end with an arm $G^2$, adapted to engage a recess $A^5$, formed in the rear of the middle section A', near its lower end, as plainly shown in Fig. 2. The rear end of the bolt G is connected with a rope or wire $G^3$, passing through an eye $G^4$, held on the handle F. The rear end of the wire or rope $G^3$ carries a ring $G^5$, serving as a handle for conveniently withdrawing the bolt G from engagement with the middle section A', for the purpose hereinafter mentioned.

On the middle section A', above the eye D, is arranged a similar eye D', and at the sides of the said eye D are arranged eyes $D^2$, either of which is adapted to be engaged by a clasp or spring-hook J', held on the outer end of an auxiliary handle J for controlling the position of the plate A in applying the same on the outside of the ship, as illustrated in Fig. 6.

In order to draw the plate A in position on the side of the vessel, a strap K' is provided, formed at one end with a hook or clasp K, adapted to engage one of the eyes D' or $D^2$, as plainly illustrated in Figs. 7 and 8. The strap K' is preferably made of leather and passes through an opening L', formed in a fastening-bar L, adapted to extend across the opening in the side of the vessel and at the inside thereof, as illustrated in said Fig. 7.

In order to hold the strap K' in place in the fastening-bar L, a wedge N is provided, engaging the said strap in the opening L' and formed on one face with projections or teeth engaging the upper surface of the said strap to lock the latter in place when the wedge is pressed inward or the strap pulled. A spring N', held on the bar L, serves to press the said wedge inward to hold the strap securely in place on the fastening-bar.

On the several sections of the plate A are arranged a number of screw-plugs O, adapted to be unscrewed after the plate is folded over the opening in the side of the vessel, so that the threads in the said sections can be engaged by bolts Q (see Fig. 13) for securely locking the several sections in place on the side or bottom of the vessel. The sections are also adapted to be engaged at the plug-openings by bolts P, each of which is provided with one, two, or more nuts P' $P^2$, and also with a head $P^3$, pivoted at $P^4$ to the bolt, and adapted to fold into a recess in the end of the bolt, as plainly shown in Fig. 12. The head $P^3$ in a normal position extends in line with the bolt, as plainly shown in said Fig. 12; but when the bolt is applied and passed through one of the openings formerly occupied by one of the plugs O then the said head $P^3$ is swung into an angular position by the operator pulling on a cord or wire $P^5$, connected with one projecting end of the said head $P^3$. The head $P^3$ then extends at right angles to the bolt and abuts against the outside of the respective section of the plate A. The inner end of the bolt P, after passing through the opening to be closed by the plate A or through the side of the vessel, passes through openings $L^2$ in the bar L to be locked in place by the nuts P' and $P^2$, as plainly shown in the drawings. The inner faces of the sections A', $A^2$, and $A^3$ are preferably covered with leather, rubber, or other suitable material, so as to prevent leakage when the plate A is applied over the side of the vessel to close the leak.

The operation is as follows: When the several sections $A^2$ and $A^3$ are folded upon the section A', as previously described, and locked in place by the bolt C' engaging the eye C, then the said plate is hung in a folded position onto the hook E of the handle F, which latter is taken hold of by the operator to thrust the plate A through the opening in the side or bottom of the vessel made by a shot or other causes. The plate A is locked in place on the handle F by the bolt G in the manner formerly described, the hook H engaging the ring $C^9$. It is understood that when the plate A is locked to the handle the spring I is pressed and rests between the under side of the handle and the top of the middle section A'. (See Fig. 4.) When the operator has passed the plate through the opening in the side or bottom of the vessel, as illustrated in Fig. 5, he then pulls the ring $G^5$, so that bolt G is drawn out of engagement with the recess $A^5$ to permit the spring I to exert its power on the plate A and force the same into a vertical position. (Shown in Fig. 6.) If necessary, the auxiliary handle may now be put in use to guide the plate A into proper position over the breach-opening. As soon as the plate A is in a vertical position the operator moves the handle F inward, so as to bring the middle section A′ as soon as possible over the middle of the opening, at the same time pulling on the ring $H^3$, so that the bolt C′ is withdrawn from the eye C, and the force of the springs B causes the sections $A^2$ and $A^3$ to swing open into line with the middle section A′, thus completely closing the opening in the side of the vessel. Now in order to lock the plate A in position the strap K′ is first hooked onto one of the eyes D′ or $D^2$ and then fastened, after drawing the said strap tight, onto the bar L, placed across the opening to rest on the surface of the side of the vessel, as shown in Fig. 7. The plate A is now temporarily locked in place, and the operators may now unscrew the visible screw-plugs O to pass the bolts P in the threaded openings formerly occupied by the plugs. When the head $P^3$ has been passed through one of the openings, the cord or wire $P^5$ is pulled, so that the head $P^3$ is swung into an angular position relative to the bolt to engage the outside of the respective section. The bolts P are then fastened by means of the nuts P′ and $P^2$ in place on the bar L, as previously described. The bar L in turn can be fastened to the side of the vessel by means of set-screws $L^3$ screwing into the vessel's side. (See Fig. 7.)

The plugs O are arranged in such a manner on the several sections that their position can be easily determined, even if one of the plugs engages a solid part of the side of the vessel, so that an operator can bore or drill a hole through the side of the vessel to finally unscrew the plug to engage a threaded opening by a bolt P, fastened by one of the nuts P′ or $P^2$ in position on the side of the vessel.

It is understood that the handles F and J are disconnected from the plate A as soon as the latter is in position over the leak-opening and is temporarily locked in place by the strap K′ and a few bolts Q, as previously described.

It is understood that by covering the inner surfaces of the sections A′, $A^2$, and $A^3$ with felt, rubber, or other material a water-tight joint is formed between the plate and the side of the vessel. If desired, an automatic fixture may be attached to the plate, so as to hold or lock the sections $A^2$ and $A^3$ in an open position before the bolts are inserted.

In order to prevent leakage on the joints of the sections A′, $A^2$ and $A^3$, one or more strips R, of leather, metal, or other material, are employed for each joint. Each strip is screwed on or otherwise fastened over the joint on the adjacent sections, as indicated in dotted lines on Fig. 1. On one of the sections, preferably the section $A^2$, is indicated a figure "S," representing the size of the smallest opening through which the folded plate can be passed. It will be seen that by the arrangement, as described, the opening in the side or bottom of a vessel can be very quickly closed, so as to prevent the vessel from filling with water.

Having thus described my invention, I claim as new and desire to secure by Letters Patent—

1. A leak-stopper for vessels, comprising three sections, the outermost sections being hinged to the inner section to fold thereon, and means for holding the sections folded, substantially as described.

2. A leak-stopper for vessels, comprising three sections hinged together, so that the outermost sections will fold upon the central section, means for holding the outermost sections folded, and springs for extending the said outermost sections when released, substantially as herein shown and described.

3. In a leak-stopper, the combination, with spring-pressed and hinged plates, of means for locking the outer plates folded upon the inner plates, a handle connected to the said plates for thrusting them through an aperture in the folded position, and means for disengaging the folded plates to allow them to be extended, substantially as described.

4. In a leak-stopper, the combination, with a plate made in sections hinged together and adapted to be folded one upon the other, of means for locking the said sections in position when folded, a handle adapted to engage one of the said sections to support the said plate in order to pass the same through the opening or leak, a bolt held on the said handle and serving to lock the said plate in a folded position to the said handle, and means for releasing the locking mechanism to allow the outer sections to be extended, substantially as shown and described.

5. In a leak-stopper, the combination, with a plate made in sections hinged together and adapted to be folded one on the other, of means for locking the said sections in position when folded, a handle adapted to engage one of the said sections to support the said plate in order to pass the same through the opening or leak, a bolt held on the said handle and serving to lock the said plate in a folded position to the said handle, and a spring interposed between the said handle and plate and compressed when the said sections are locked to the said handle, substantially as shown and described.

6. In a leak-stopper, the combination, with a plate made in spring-pressed sections hinged together and adapted to be folded, of a bolt for locking the said sections in a folded position, a handle for carrying the said plate, and means, substantially as described, for withdrawing the said bolt to unlock the said sections, substantially as shown and described.

7. In a leak-stopper, the combination, with a plate, of a handle for supporting the said plate, a spring held on the said handle and adapted to engage with its free end the said plate, and a bolt for locking the said plate when the said spring is compressed between the handle and the plate, substantially as shown and described.

8. In a leak-stopper, the combination, with a plate made in sections hinged together and adapted to be folded one upon the other, of springs pressing the said sections, and a handle formed with a hook adapted to engage an eye on one of the said sections, substantially as shown and described.

9. In a leak-stopper, the combination, with a plate made in sections hinged together and adapted to be folded one upon the other, of springs pressing said sections, a handle formed with a hook adapted to engage an eye on one of the said sections, and a bolt for locking the said plate to the said handle, substantially as shown and described.

10. In a leak-stopper, the combination, with a plate made in sections hinged together and adapted to be folded one upon the other, of a handle pivotally connected with one of the said sections, and an auxiliary handle adapted to engage the said plate to assist in manipulating the same, substantially as shown and described.

11. In a leak-stopper, the combination, with a plate made in sections hinged together and provided with threaded openings adapted to be closed by screw-plugs, of bolts engaging the said threaded openings when the screw-plugs are removed, and a fastening-bar adapted to engage the inner surface of the side or bottom of the vessel and to be connected with the said bolts, substantially as shown and described.

12. In a leak-stopper, the combination, with a plate made in sections hinged together and adapted to be placed on the outer surface of the side of the vessel, of eyes held on one of the said sections, a strap adapted to engage one of the said eyes, and a fastening-bar connected with the said strap and adapted to engage the inner surface of the side of the vessel, substantially as shown and described.

13. In a leak-stopper, the combination, with a plate made in sections hinged together and adapted to be placed on the outer surface of the side of the vessel, of eyes held on one of the said sections, a strap adapted to engage one of the said eyes, a fastening-bar connected with the said strap and adapted to engage the inner surface of the side of the vessel, and means, substantially as described, for locking the said strap on the said fastening-bar, as set forth.

FRANCIS F. JONES.

Witnesses:
GEORGE MILLER,
JOHN H. AINSLIE.